United States Patent [19]
Chuang

[11] Patent Number: 5,620,033
[45] Date of Patent: Apr. 15, 1997

[54] WORKPIECE DELIVERING DEVICE USABLE AS A HANDLE FOR A MACHINE

[75] Inventor: Bor-Yann Chuang, Taichung Hsien, Taiwan

[73] Assignee: Chiu Ting Machinery Co., Ltd, Taichung Hsien, Taiwan

[21] Appl. No.: 576,309

[22] Filed: Dec. 21, 1995

[51] Int. Cl.⁶ .................................................. B27C 1/12
[52] U.S. Cl. .................................. 144/246.1; 144/117.1; 144/242.1; 198/828
[58] Field of Search .......................... 144/117.1, 246.1, 144/242.1; 483/28; 198/824, 828, 780

[56] References Cited

U.S. PATENT DOCUMENTS

| | | | |
|---|---|---|---|
| 4,932,448 | 6/1990 | Maioli et al. | 144/246.1 |
| 5,176,190 | 1/1993 | Miyamoto et al. | 144/117.1 |

*Primary Examiner*—W. Donald Bray
*Attorney, Agent, or Firm*—Ladas & Parry

[57] ABSTRACT

A workpiece delivering device is to be used in a machine which has a top face formed with a channel that extends between input and output ends of the machine and that has opposite channel walls and a channel bottom. The workpiece delivering device includes a first rotatable cylinder to be disposed in the channel and having two ends adapted to be mounted rotatably and respectively on the channel walls such that the first rotatable cylinder projects upwardly relative to the top face of the machine, and a second rotatable cylinder. Each of a pair of pivot arms has a cylinder supporting end and an opposite pivot end which extends into the channel on one side of the first rotatable cylinder and which is adapted to be mounted pivotally on a respective one of the channel walls. The second rotatable cylinder is mounted rotatably on the cylinder supporting ends of the pivot arms.

3 Claims, 4 Drawing Sheets

WORKPIECE DELIVERING DEVICE USABLE AS A HANDLE FOR A MACHINE

BACKGROUND OF THE INVENTION

1. Field of the Invention

The invention relates to a workpiece delivering device for a machine, more particularly to a workpiece delivering device that can be used as a handle for a machine.

2. Description of the Related Art

A surface shaping machine is employed to form a desired surface on a wooden workpiece. Normally, the wooden workpiece is fed twice to the surface shaping machine so that the desired surface can be formed on opposite sides of the wooden workpiece. To facilitate forming of the desired surface on a second side of the wooden workpiece, a workpiece delivering device is usually installed on a top face of the surface shaping machine so that the workpiece can be conveniently delivered from an output end back to an input end of the surface shaping machine.

Referring to FIG. 1, a conventional surface shaping machine 10 is shown to have a top face 11 provided with a workpiece delivering device which includes three parallel rotatable cylinders 12 that project upwardly relative to the top face 11. When processing a wooden workpiece 1, the wooden workpiece 1 is fed to the surface shaping machine 10 via an input end 13 of the latter. After one side of the wooden workpiece 1 has undergone shaping by the machine 10, the wooden workpiece 1 is provided on the workpiece delivering device to deliver the wooden workpiece 1 back to the input end 13 of the machine 10 for shaping a second side of the wooden workpiece 1.

Note that the conventional surface shaping machine 10 is not provided with a handle on the top face 11 since the handle may obstruct movement of the cylinders 12, thereby affecting the workpiece delivering operation of the latter. Thus, handles 14 (only one is shown) are usually installed on two opposite sides of the machine 10 to permit moving of the machine 10 from one location to another. However, the surface shaping operation only requires one operator, and the surface shaping machine 10 is sufficiently light to enable one person to carry the same. Since the machine 10 is relatively wide such that one person is prevented from grasping the two handles 14, the operator of the machine 10 has to rely on another person to help him move the machine 10.

SUMMARY OF THE INVENTION

Therefore, the object of the present invention is to provide a workpiece delivering device that can be used as a handle for a machine so as to overcome the aforementioned drawback that is commonly associated with the prior art.

Accordingly, the workpiece delivering device of the present invention is to be used in a machine which has a top face formed with a channel that extends between input and output ends of the machine and that has opposite channel walls and a channel bottom. The workpiece delivering device includes a first rotatable cylinder to be disposed in the channel and having two ends adapted to be mounted rotatably and respectively on the channel walls such that the first rotatable cylinder projects upwardly relative to the top face of the machine, and a second rotatable cylinder. Each of a pair of pivot arms has a cylinder supporting end and an opposite pivot end which extends into the channel on one side of the first rotatable cylinder and which is adapted to be mounted pivotally on a respective one of the channel walls. The second rotatable cylinder includes an axle having two ends mounted respectively to the cylinder supporting ends of the pivot arms, and a cylindrical tube sleeved rotatably on the axle. The pivot arms are movable between a first position, wherein the pivot arms lie in substantially horizontal positions such that the second rotatable cylinder is disposed in the channel and projects upwardly relative to the top face of the machine so that a workpiece can be delivered by the first and second rotatable cylinders between the input and output ends of the machine, and a second position, wherein the pivot arms extend vertically upward to permit lifting of the machine when the second rotatable cylinder is grasped. A pair of cushioning units are adapted to be secured on the channel bottom to support the pivot arms when the latter are in the first position in order to ensure that the second rotatable cylinder projects upwardly relative to the top face of the machine.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
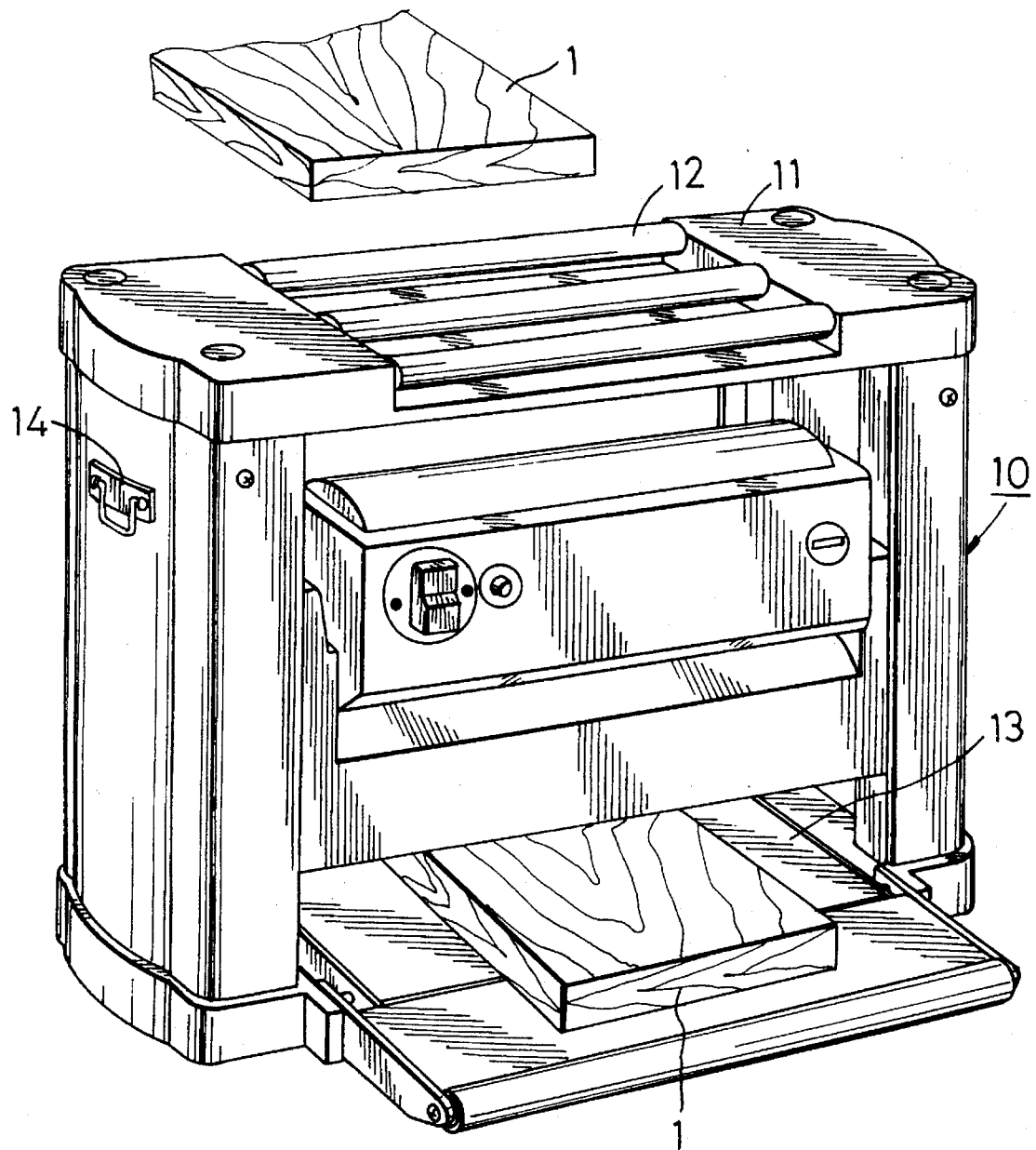
FIG. 1 is a perspective view illustrating a surface shaping machine with a conventional workpiece delivering device.
Figure 2:
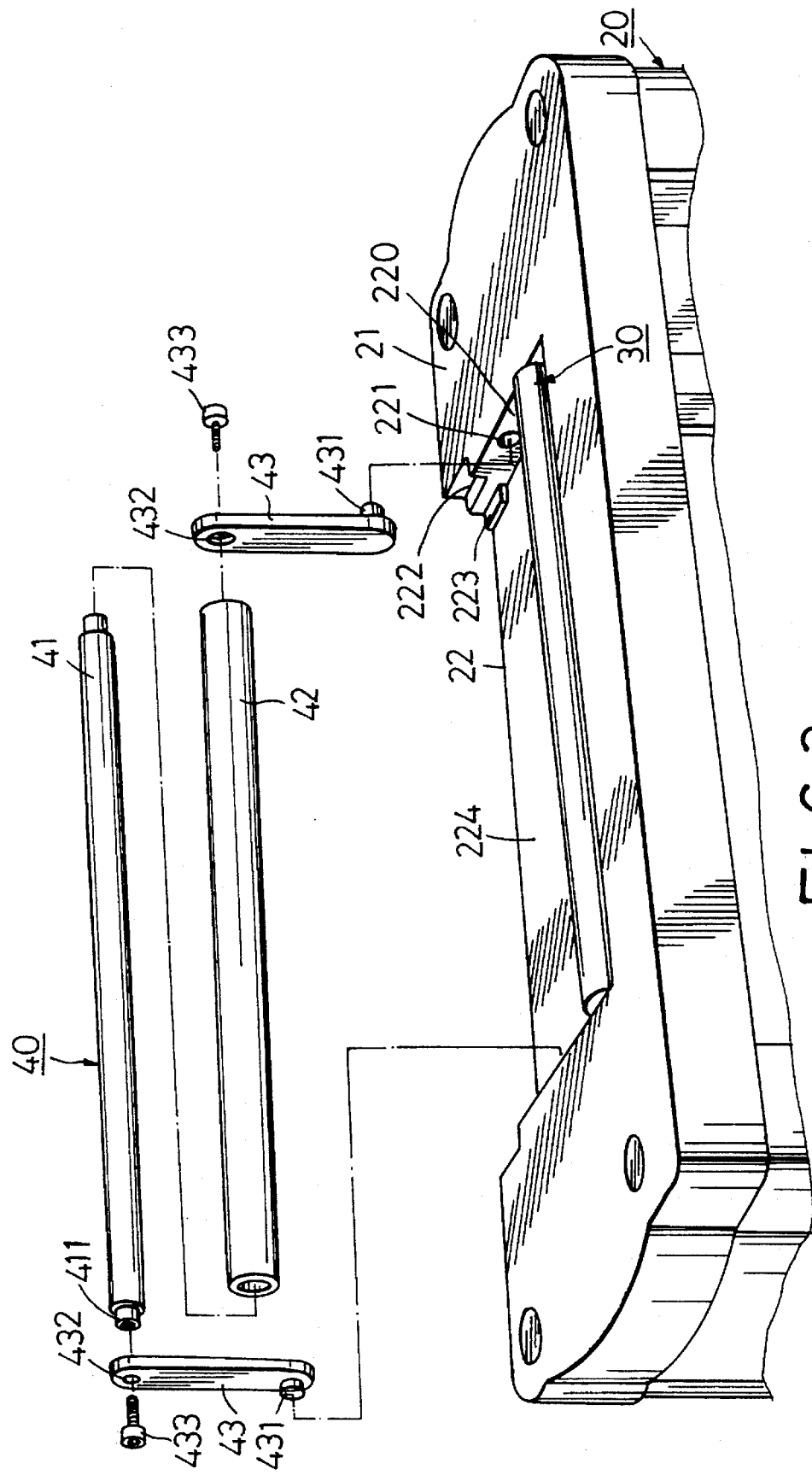
FIG. 2 is an exploded view of the preferred embodiment of a workpiece delivering device according to the present invention.

Referring to FIG. 2, the preferred embodiment of a workpiece delivering device according to the present invention is shown to be installed in a rectangular channel 22 formed in a top face 21 of a surface shaping machine 20, and includes parallel first and second rotatable cylinders 30, 40 that project upwardly relative to the top face 11. The first and second rotatable cylinders 30, 40 are capable of supporting a wooden workpiece 1 (see FIG. 4) thereon to deliver the latter from an output end to an opposite input end of the machine 20.

The channel 22 has left and right channel walls 220 and a channel bottom 224. Each of the channel walls 220 has an intermediate portion formed with a pivot hole 221 and a rear end portion formed with a notch 222. A pair of cushioning units 223 are secured on the channel bottom 224 and are disposed adjacent to the notch 222 on a respective one of the channel walls 220.

The first rotatable cylinder 30 is disposed in a front end portion of the channel 22 and has two ends mounted securely, rotatably and respectively on the channel walls 220 such that the first rotatable cylinder 30 projects relative to the top face 21 of the machine 20.

The second rotatable cylinder 40 includes an axle 41 and a cylindrical tube 42 sleeved rotatably on the axle 41. The axle 41 has two ends formed with a respective internally threaded socket 411. Each of a pair of pivot arms 43 has a cylinder supporting end formed with a through-hole 432, and an opposite pivot end formed with a pivot stub 431. The pivot end of each pivot arm 43 extends into the channel 22 on one side of the first rotatable cylinder 30 such that the pivot stub 431 extends into the pivot hole 221 on a respective channel wall 220, thereby mounting pivotally the pivot arms 43 onto the channel walls 220. Screws 433 extend through the through-holes 432 in the cylinder supporting ends of the pivot arms 43 and engage threadedly the sockets 411 on the two ends of the axle 41, thereby mounting the second rotatable cylinder 40 on the cylinder supporting ends of the pivot arms 43.

Figure 3:
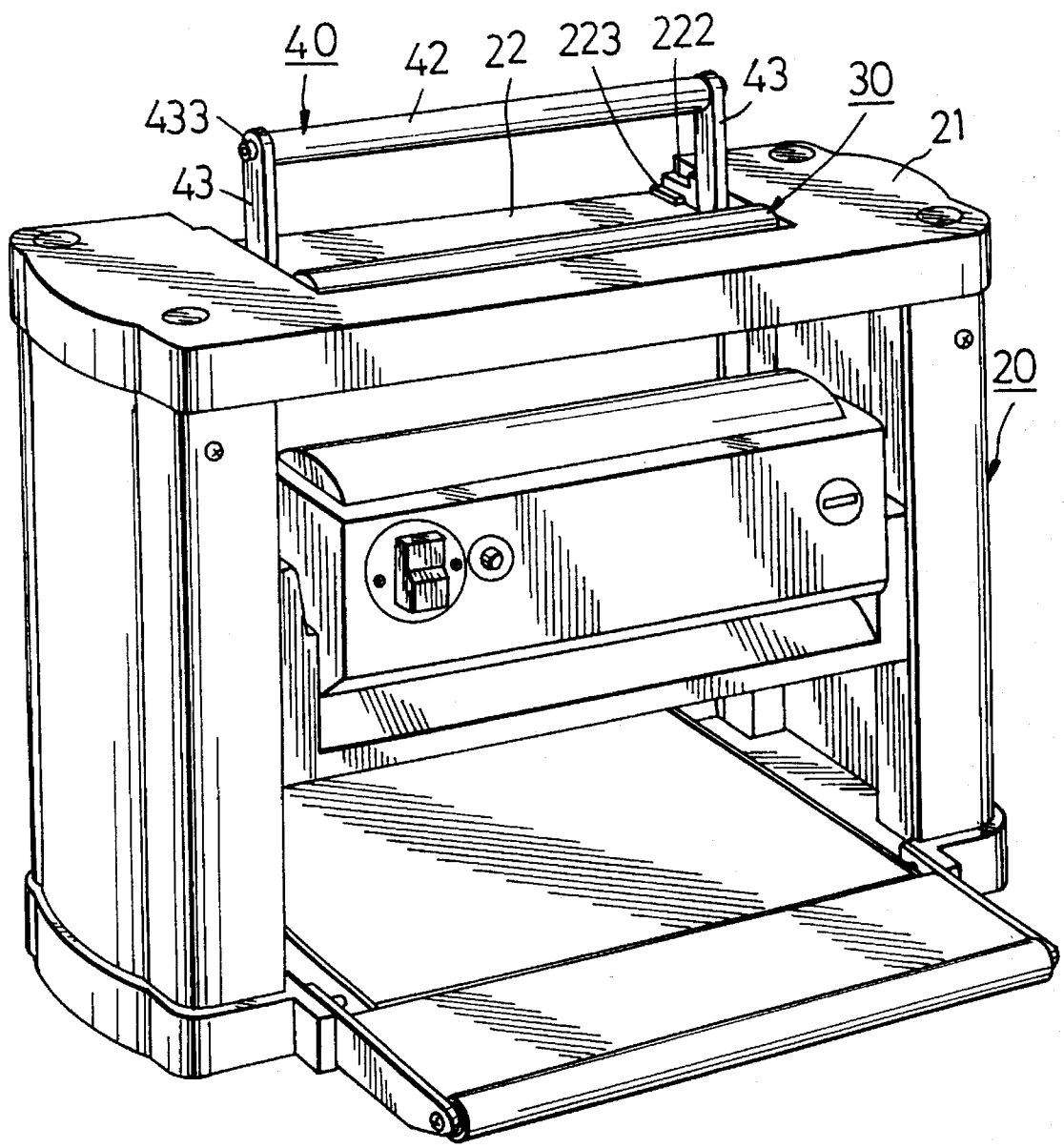
FIG. 3 is a perspective view illustrating the preferred embodiment when installed on a surface shaping machine.

Referring to FIG. 3, when it is desired to move the machine 20, the pivot arms 43 are pivoted so as to extend vertically upward. At this time, the second rotatable cylinder 40 can serve as a handle to permit lifting of the machine 20 by only one person when the second rotatable cylinder 40 is grasped. Alternatively, a hoisting machine (not shown) may be hooked onto the second rotatable cylinder 40 to facilitate moving of the machine 20.

Figure 4:
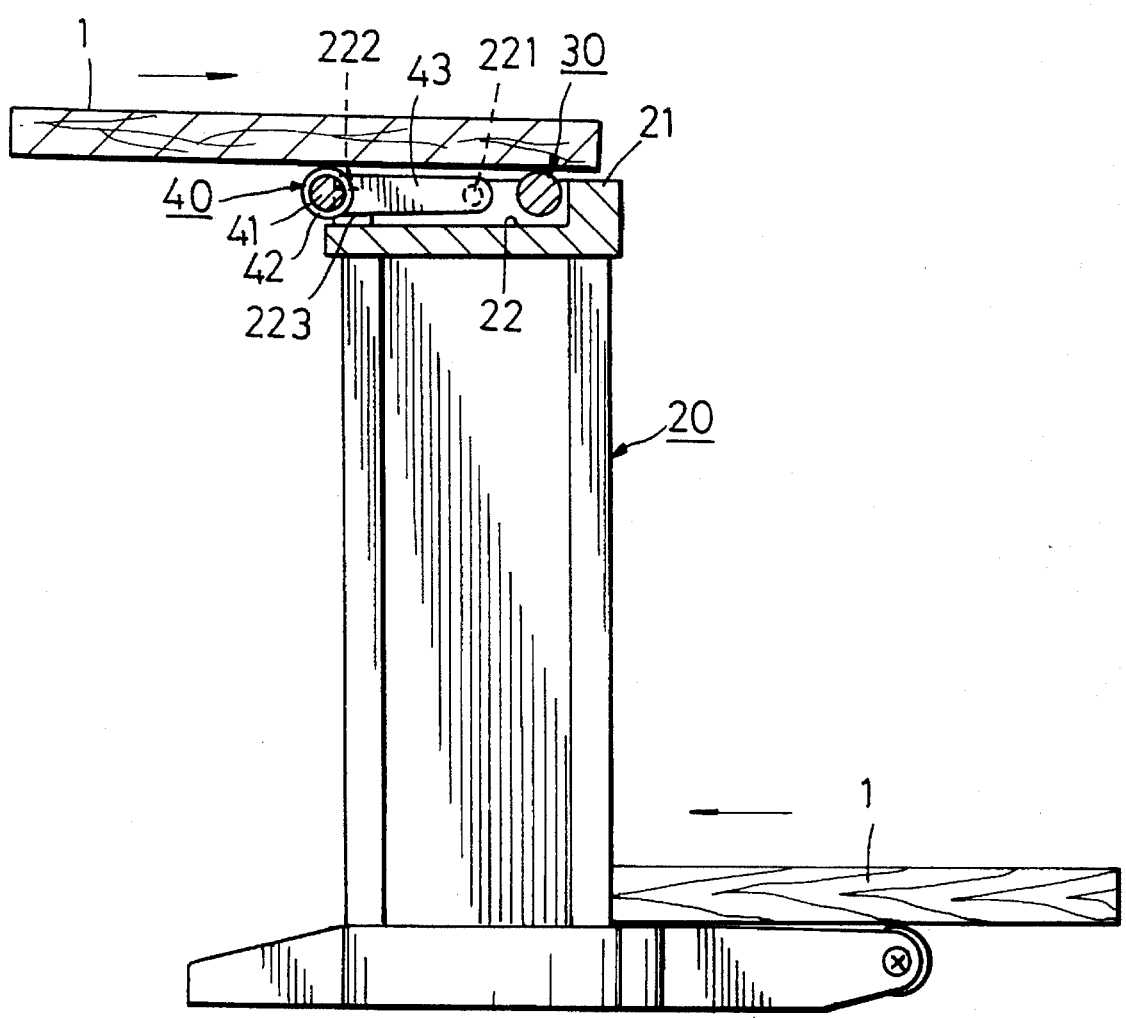
FIG. 4 is a schematic, partly sectional view illustrating a workpiece delivering operation of the preferred embodiment.

Referring to FIG. 4, when the machine 20 is used to process a wooden workpiece 1, the pivot arms 43 are pivoted so as to lie in substantially horizontal positions in the channel 22. At this time, the second rotatable cylinder 40 is disposed in the rear end portion of the channel 22, and the heads of the screws 433 extend into the notches 222 in the channel walls 220. The pivot arms 43 are supported on the cushioning units 223 to ensure that the second rotatable cylinder 40 projects upwardly relative to the top face 21 of the machine 20 and that the cylindrical tube 42 does not touch the channel bottom 224. Preferably, the second rotatable cylinder 40 is disposed slightly higher than the first rotatable cylinder 30. Thus, after one side of the wooden workpiece 1 has undergone shaping by the machine 20, the wooden workpiece 1 is provided on the first and second rotatable cylinders 30, 40 so that the wooden workpiece 1 can slide from the output end back to the input end of the machine 20 in order to shape a second side of the wooden workpiece 1.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A workpiece delivering device for a machine, the machine having a top face formed with a channel that extends between input and output ends of the machine and that has opposite channel walls and a channel bottom, the workpiece delivering device being adapted to be installed in the channel and comprising:

a first rotatable cylinder to be disposed in the channel and having two ends adapted to be mounted rotatably and respectively on the channel walls such that said first rotatable cylinder projects upwardly relative to the top face of the machine;

a second rotatable cylinder; and a pair of pivot arms, each of said pivot arms having a cylinder supporting end and an opposite pivot end which extends into the channel on one side of said first rotatable cylinder and which is adapted to be mounted pivotally on a respective one of the channel walls, said second rotatable cylinder being mounted rotatably on said cylinder supporting ends of said pivot arms, said pivot arms being movable between a first position, wherein said pivot arms lie in substantially horizontal positions such that said second rotatable cylinder is disposed in the channel and projects upwardly relative to the top face of the machine so that a workpiece can be delivered by said first and second rotatable cylinders between the input and output ends of the machine, and a second position, wherein said pivot arms extend vertically upward to permit lifting of the machine when said second rotatable cylinder is grasped.

2. The workpiece delivering device for a machine as claimed in claim 1, wherein said second rotatable cylinder includes an axle having two ends mounted respectively to said cylinder supporting ends of said pivot arms, and a cylindrical tube sleeved rotatably on said axle.

3. The workpiece delivering device for a machine as claimed in claim 1, further comprising a pair of cushioning units adapted to be secured on the channel bottom to support said pivot arms when said pivot arms are in said first position in order to ensure that said second rotatable cylinder projects upwardly relative to the top face of the machine.

* * * * *